United States Patent [19]
Minich et al.

[11] Patent Number: 5,700,076
[45] Date of Patent: Dec. 23, 1997

[54] LASER ILLUMINATED IMAGE PRODUCING SYSTEM AND METHOD OF USING SAME

[75] Inventors: Arthur P. Minich; David W. Kappel, both of San Diego; David E. Hargis, La Jolla; Shlomo Assa, Encinitas, all of Calif.

[73] Assignee: Proxima Corporation, San Diego, Calif.

[21] Appl. No.: 292,619

[22] Filed: Aug. 18, 1994

Related U.S. Application Data

[63] Continuation-in-part of Ser. No. 279,943, Jul. 25, 1994, Pat. No. 5,517,263.

[51] Int. Cl.[6] ............................................. G03B 21/00
[52] U.S. Cl. ........................... 353/31; 348/771; 349/61
[58] Field of Search .................. 353/31, 33, 37, 353/98, 121, 122; 359/42, 48, 72, 212, 223; 348/771, 768; 345/9, 31, 85, 7, 1

[56] References Cited

U.S. PATENT DOCUMENTS

| | | |
|---|---|---|
| 4,018,509 | 4/1977 | Boswell et al. ............................ 359/72 |
| 4,060,316 | 11/1977 | Pollack et al. ............................ 359/72 |
| 4,851,918 | 7/1989 | Crowley . | 
| 5,079,544 | 1/1992 | DeMoud et al. . |
| 5,192,946 | 3/1993 | Thompson et al. ....................... 348/764 |
| 5,221,980 | 6/1993 | Yamamoto et al. ....................... 359/72 |
| 5,229,872 | 7/1993 | Mumola ................................. 359/42 |
| 5,384,649 | 1/1995 | Takimoto et al. ......................... 359/72 |
| 5,432,567 | 7/1995 | Matsuda ................................. 359/72 |

*Primary Examiner*—William C. Dowling
*Attorney, Agent, or Firm*—Bernard L. Kleinke; Peter P. Scott

[57] ABSTRACT

The laser illuminated image producing system includes in one form of the invention, a single light valve which not only serves to form an image, but also to increase the number of its colors. In another form of the invention, the lasers are sequenced at high input energy for short intervals of time to provide high average output luminosity at lower average energy costs.

21 Claims, 7 Drawing Sheets

LAYOUT
UNIT MAGNIFICATION RELAY: NA = .052

POLYCHROMATIC GEOMETRIC MODULATION TRANSFER FUNCTION
UNIT MAGNIFICATION RELAY: NA = .052
MTF FOR 0.5500 MICRONS TO 0.5500 MICRONS

LASER ILLUMINATED IMAGE PRODUCING SYSTEM AND METHOD OF USING SAME

CROSS REFERENCE TO RELATED APPLICATIONS

This application is a continuation-in-part patent application of U.S. patent application Ser. No. 08/279,943, filed Jul. 25, 1994, and entitled "IMAGE PROJECTION SYSTEM AND METHOD OF USING SAME", now Pat. No. 5,517, 263, which is related to U.S. patent applications No. 08/123, 133, filed Sep. 17, 1993, now Pat. Nos. 5,483,382, and 08/122,697, filed Sep. 17, 1993, now Pat. Nos. 5,400,095, and 08/059,550, filed May 11, 1993, now Pat. Nos. 5,321, 450, and 08/243,062, filed May 12, 1994, now Pat. No. 5,453,803; wherein the foregoing patents are hereby incorporated by reference as if fully set forth herein.

TECHNICAL FIELD

The present invention relates in general to an improved image producing system and method of using it. The invention more particularly relates to a laser illuminated system which may be used to project a bright image in an efficient and relatively low cost manner, and which can be incorporated in a compact size projector used to project video images and the like.

BACKGROUND ART

The need to share digital information, such as computer generated images and text or digitized television images, with large groups of people simultaneously has resulted in the development of various types of systems for displaying an enlarged version of the desired digital image. For example, image projection systems capable of projecting digitally generated images on to a surface so that the image is displayed on the surface as a full color enlarged version of the desired image for viewing of the projected image by a group of participants have enjoyed commercial success.

Early versions of these image projection systems utilized relatively low intensity incandescent light sources for providing projection light, in conjunction with a light valve, to project an image formed in the light valve on to a distant screen. For example, such projection systems, and components thereof, are described in U.S. Pat. Nos. 5,313,321; 5,307,186; 5,303,403; 5,300,942; 5,260,815; 5,245,453; 5,231,432; 5,189,534; 5,085,506; 5,085,498; 5,032,924; 5,012,274; 4,994,901; 4,969,734; 4,848,879; 4,818,098; 4,751,509; and 4,675,702, which are incorporated herein by reference. The resulting image displayed on the screen by the foregoing image projection systems was large enough to be viewed by a group gathered within a relatively dark area. However, the displayed image would be washed out by ambient light in brighter environments, thereby limiting the usefulness of these image projection systems.

To overcome the problems associated with use in relatively bright environments, high intensity incandescent lamps and high intensity discharge lamps were utilized as light sources in image projection systems to generate the necessary bright projection light for displaying an image on a remotely located surface. While these image projection systems produced a brighter displayed image on the remote surface which could be seen even in bright ambient light conditions, the light sources were highly inefficient. In this regard, the lumen output of the light source per unit of energy consumed was relatively low. Furthermore, the use of such light sources required the image projection systems to be very bulky and expensive to manufacture.

The development of small colored lasers for use as a light source in an image projection system enabled relatively bright full color images to be projected onto a remotely located viewing surface, such as a screen. The reduced size of the lasers permitted the image projection system to be, in turn, smaller in size. Due to improved laser manufacturing techniques, the cost of the image projection system was reduced.

Image projection systems that have employed laser illumination are disclosed in U.S. Pat. Nos. 5,287,096; 5,272, 473; 5,214,420; 5,214,419; 5,206,629; 5,192,946; 5,170, 156; 5,162,787; 5,128,660; and 5,079,544, which are each incorporated herein by reference. In the foregoing laser illuminated image projection system patents, an image projection system includes a red, green and blue laser to provide a light source capable of displaying an image in full color. The colored lights emanating from the lasers cooperate with a single deformable mirror device (DMD) to project the desired full color image on to a remote screen.

One laser illuminated image projection system is disclosed in the aforementioned Pat. No. 5,287,096. In this regard, a full color image projection is achieved by activating three colored lasers sequentially, each laser being activated for an equivalent activation time period, to produce alternatingly three colored images. For example, the red laser is first activated and deactivated, and then the green laser is activated and deactivated. Finally, the blue laser is activated and deactivated before repeating the cycle. The total activation and deactivation cycle time for the three lasers is such that the sum of the associated activation time periods is less than the critical flicker frequency of the human eye. In this manner, a red, a green, and a blue image will appear to coalesce into a single full color image in the eye of the viewer.

The luminosity of the projected image is varied by rapidly modulating the relatively constant laser light emanating from each laser with the DMD. In this regard, each laser generates laser light whose intensity remains constant while the laser is activated. Each mono-colored laser light is directed onto the DMD for a predetermined activation time period. The DMD generates the desired luminosity of the projected image by: 1) reflecting the laser light onto the screen for the entire activation time period for the largest luminosity possible; 2) reflecting the laser light away from the screen for the entire activation time period for the smallest luminosity possible; and 3) reflecting the laser light onto the screen for a portion of the activation time period for an intermediate luminosity.

The luminosity of the mono-colored projected image generated by each colored laser light can be varied as described above for successive time periods to project a desired full color image. For example, to achieve the brightest possible projected full color image from a single pixel of the DMD, the pixel initially reflects all of the red laser light during the entire red laser activation time period. The red laser is deactivated and the green laser is activated, wherein the pixel reflects all of the green laser light for the entire green laser activation time period. To complete the cycle, the green laser is then deactivated and the blue laser is activated, wherein the pixel reflects all of the blue laser light for the entire blue laser activation time period.

As a result of the necessary sequencing of the three colored lasers to achieve a full color displayed image, only one laser was activated at any one time. Thus, the luminosity of the projected image was limited to the maximum lumen output of one of the lasers over its activation time period.

An improvement over the foregoing laser illuminated image projection systems was described and shown in U.S. patent application serial number, filed Jul. 25, 1994, and entitled "IMAGE PROJECTION SYSTEM AND METHOD OF USING SAME," which is incorporated by reference as if fully set forth herein. By utilizing three light valves in conjunction with three different colored lasers, it was possible to project three mono-colored images simultaneously to create a full color image. In this way, the lumen output of each colored laser could be combined, surpassing the lumen output of a single laser. Thus, an even brighter image could be generated than previously possible.

While the use of the three light valves somewhat increased the size and cost of the improved laser illuminated image projection system, the three light valves were relatively small in size. Thus, the size of a housing to enclose the improved laser illuminated image projection system was, in turn, small and compact in size.

While such a three light valve system is highly desirable, it would be advantageous to have a new and improved laser illuminated image projection system which can produce an even brighter image, including a full color image. Such a laser illuminated image producing system should operate in a highly efficient manner, and lend itself to a very small compact size.

DISCLOSURE OF INVENTION

Therefore, the principal object of the present invention is to provide a new and improved laser illuminated image projection system, and a method of using it, to produce bright display images in a highly efficient manner.

Another object of the present invention is to provide such a new and improved laser illuminated image projection system which is compact in size, and which is relatively inexpensive to manufacture.

Briefly, the above and further objects of the present invention are realized by providing a new and improved laser illuminated image producing system which can produce bright images according to a novel image illumination method and apparatus of the present invention.

The laser illuminated image producing system includes in one form of the invention, a single light valve which not only serves to form an image, but also to increase the number of its colors. In another form of the invention, the lasers are sequenced at high input energy for short intervals of time to provide high average output luminosity at lower average energy costs.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
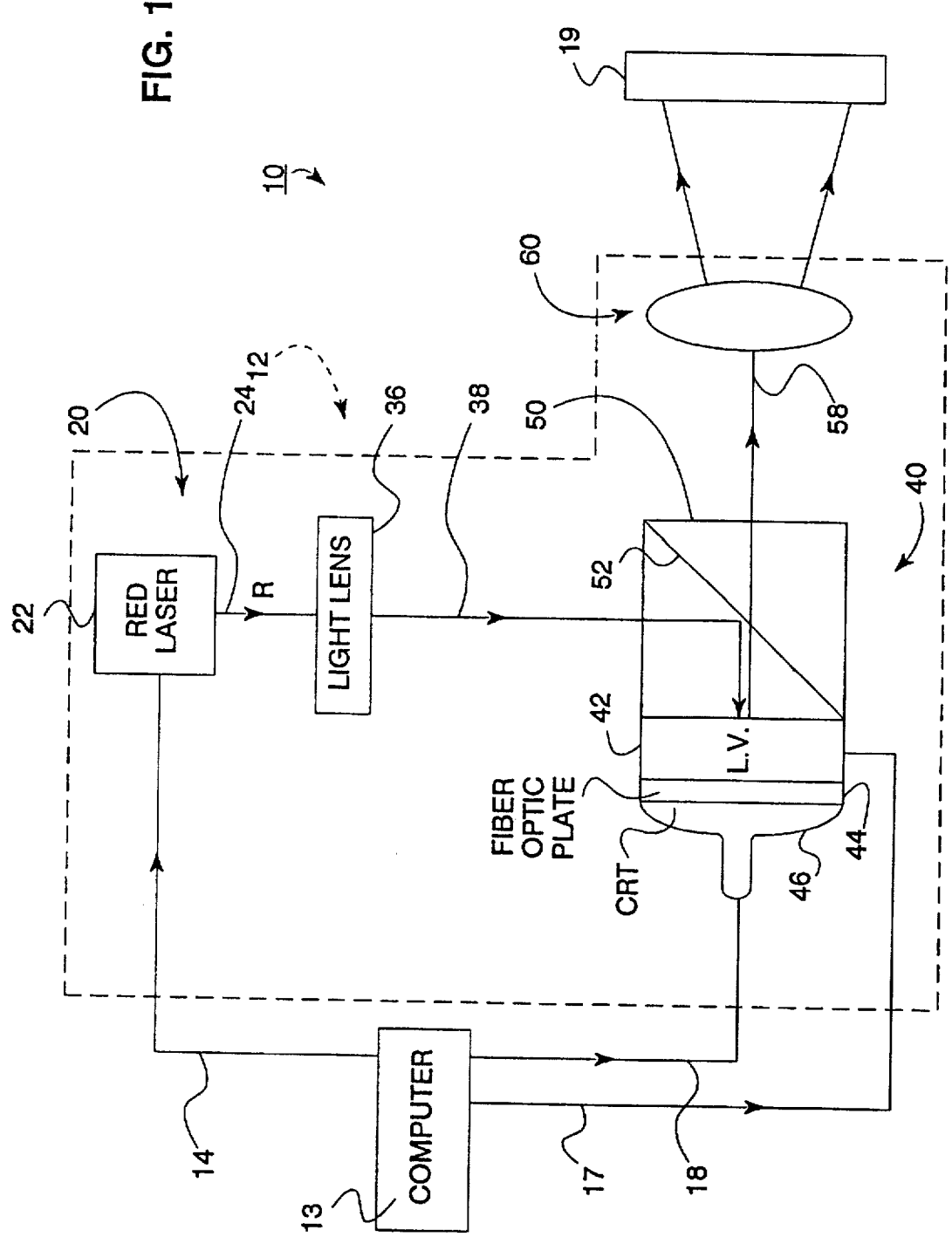
FIG. 1 is a block diagram of a laser illuminated image projection system, which is constructed in accordance with the present invention.

Referring now to the drawings, and more particularly to FIG. 1 thereof, there is shown an image producing system 10, which is constructed in accordance with the present invention. The image producing system 10 readily projects images for viewing in accordance with the method of the present invention.

The image producing system 10 generally comprises an image generating arrangement 12 having a light source to produce a coherent projection light along an output optical path 38, a spacial modulator means 40 disposed in the output optical path 38 to modulate the coherent projection light producing an output light representative of the image to be projected along an output optical path 58, and a projection lens system 60 disposed in the output optical path 58 to project the image. The image producing system further includes a computer 13 to control the image generating apparatus 12 and a remote surface 19 for receiving the projected image.

In use, the light source 20 generates the coherent projection light along input optical path 38. The coherent projection light is modulated by the spacial light modulator means 40, thereby producing the output light along the output optical path 58. The projection lens focuses the output light and projects it onto the remote surface 19 for viewing. The computer 13, connected to the light source 20 by conductor 14, and connected to the spacial light modulator means 40 by conductors 17 and 18, controls and coordinates the activation of light source 20 in conjunction with the spacial light modulator means 40 to generate the desired image which is projected onto the remote surface 19.

Considering now the light source 20 in greater detail, conductor 14 is connected to a red laser 22. Red laser 22 functions only in one of two states, either an ON state or an OFF state. In the OFF state, the light output of the red laser 22 is substantially zero. When switched to the ON state, the red laser 22 generates a high intensity light along source optical path 24. In this way, the red laser 22 can be controllably and selectively switched between its ON and OFF states to generate pulses of light along source optical path 24 whose luminosity levels vary between a substantially zero luminosity level and a maximum luminosity level.

The light source 20 further includes a light lens 36 disposed in the source optical path 24 to expand the cross-sectional area of the laser light generated by the red laser 22 along the source optical path 24 to produce the coherent projection light 38.

In use, the red laser 22 is controlled by the computer 13 via conductor 14 to switch between its ON and OFF states, thereby generating pulses of laser light having an amplitude varying between a minimum and a maximum luminosity level along the source optical path 24. The pulses of laser light impinge the light lens 36, wherein the cross sectional area of the laser light is increased, resulting in the coherent projection light emanating from the light lens 36.

The light lens 36 permits substantially all of the laser light to pass therethrough. In this regard, the coherent projection light traveling along input optical path 38 is substantially similar to the red laser light traveling along the source optical path 24, except that the cross sectional area of the coherent projection light is larger than that of the laser light.

Considering now the spacial light modulator means 40 in greater detail, the spacial light modulator means includes a reflective light valve 42 for modulating the pulses of coherent projection light along the input optical path 38 for producing the output light along the output optical path 58. The light valve 42 is a beam addressed device. In this regard, the coherent projection light acts as a reading light for projecting the desired image. The writing light for forming the image within the light valve 42 is provided by a cathode ray tube or CRT 46. The CRT 46 is optically connected to the light valve 42 by a FIBER OPTIC PLATE 44.

The light valve 42 and the CRT 46 are connected to the computer 14 by conductors 17 and 18, respectively. In this regard, the CRT 46 is controlled to provide a writing light image representative of the desired image. The optical image generated by the CRT 46 is transferred to the light valve 42 by the FIBER OPTIC PLATE 44. Similarly, the light valve 42 is controlled by the computer 14 to further define the desired image within the light valve 42.

The spacial light modulator means 40 further includes a polarizing beam splitter 50 having a reflective surface 52 to redirect the coherent projection light onto the light valve 42. Other types of reflecting devices, including mirrors, are also contemplated and are within the scope of the present invention.

The light valve 42 is preferably a photoelectric light valve, such as the photoelectric light valve as manufactured by Ampro GrayHawk. The size and shape of CRT 46 is selected to be substantially similar to the surface area of the light valve 42 to ensure that the optical information generated by the CRT 46 is efficiently utilized by the light valve 42. In order to ensure that the coherent projection light is also utilized efficiently, the cross sectional area of the coherent projection light is adjusted to be substantially equal to the frontal surface area of the light valve 42 upon which the coherent projection light impinges.

In use, the pulses of coherent projection light enter the polarizing beam splitter 50 and are reflected by the reflecting surface towards the light valve 42. The computer 13 coordinates the controlling of the light valve 42 and the CRT 46 to modulate the coherent projection light and to generate the output light along the output optical path 58. In this regard, substantially all of the output light generated by the light valve 42 is directed towards the projection lens system 60 to be projected onto the remote surface 19.

As a result of the switching of the red laser 22, the coherent projection light varies in luminosity between a minimum luminosity level and a maximum luminosity level. During the time that the red laser 22 is in its ON state, in generating the projection light at its maximum luminosity level, the light valve 42 controls the luminosity of the coherent projection light modulated by the light valve 42, to permit the desired image to be reproduced and projected onto the remote surface 19 with varying shades. In this regard, the light valve 42 controls the luminosity of the output light to produce a gray scaled version of the desired image to be projected.

Figure 2:
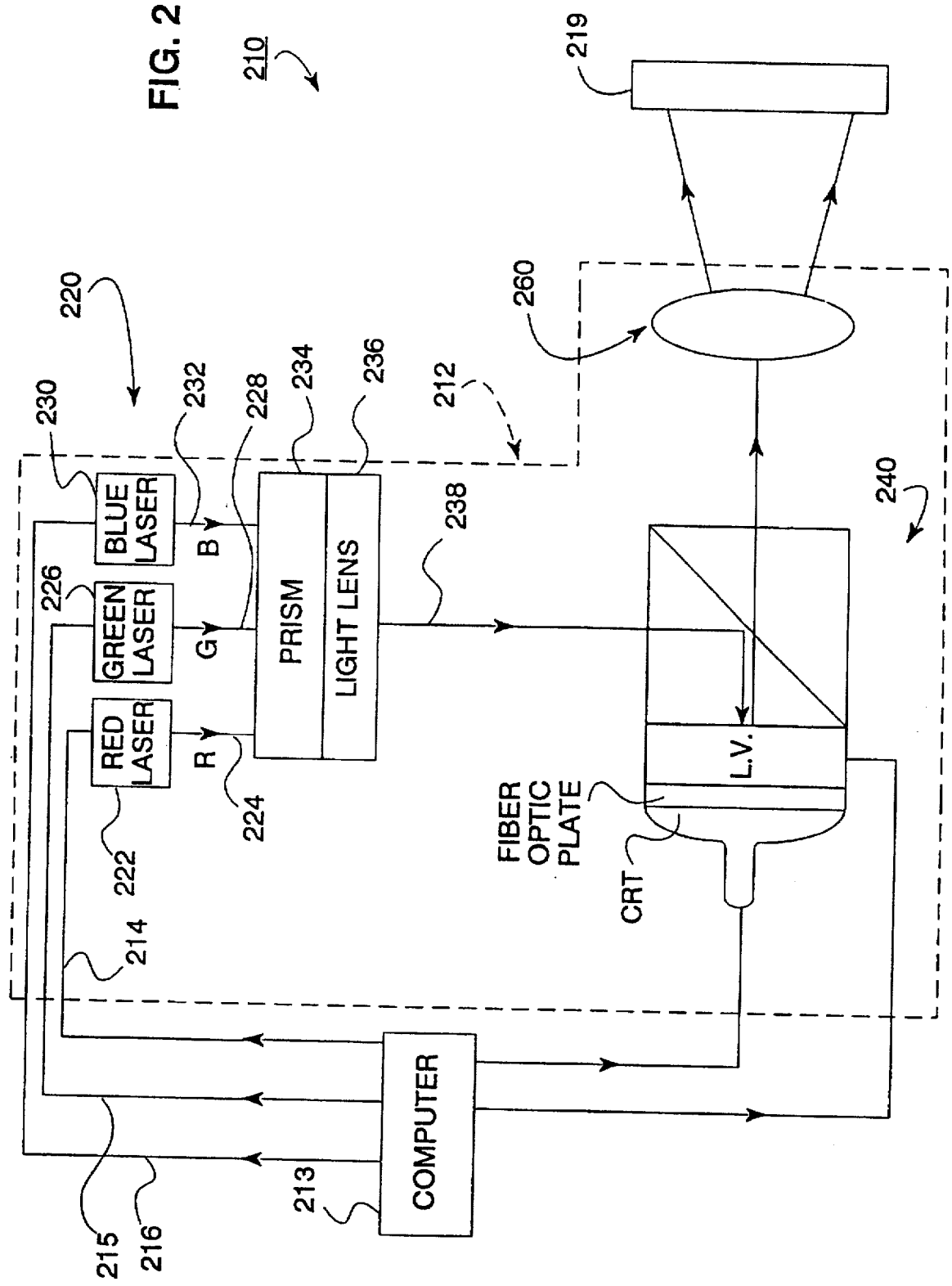
FIG. 2 is a block diagram of another laser illuminated image projection system, which is also constructed in accordance with the present invention.

Referring now to FIG. 2, there is shown another image producing system 210, which is also constructed in accordance with the present invention. The image producing system 210 is substantially similar to the image producing system 10, and includes an image generating arrangement 212, a computer 13 to control the image generating arrangement 212, and a remote surface 219 to display the projected image.

Considering now the image generating arrangement 212 in greater detail, the image generating arrangement 212 includes a light source 220 to provide mono-colored pulses of red, green, and blue coherent projection light. The image generating arrangement 212 further includes a spacial light modulator means 240 and a projection lens system 260. As spacial light modulator 240 and projection lens system 260 are substantially similar to the spacial light modulator means 40 and the projection lens system 60, respectively, they will not be considered hereinafter in greater detail.

Considering now the projection light source 220 in greater detail, the light source 220 includes a red laser 222 to produce a red high intensity light along source optical path 224, a green laser 226 to generate a green high intensity light source optical path 228, and a blue laser 230 to generate a blue high intensity light along source optical path 220. Red laser 222, green laser 226 and blue laser 230 are connected to the computer 213 by conductors 214, 215 and 216, respectively, to selectively switch each of the lasers 222, 226 and 230 between their ON and OFF states. In this way, the lasers 222, 226 and 230 can generate sequential mono-colored pulses of light, wherein each mono-colored pulse of light is generated at its maximum luminosity level.

The light source 220 further includes a prism 234 disposed in the source output path 224, 228 and 232 to focus the pulses of mono-colored high intensity light before entering a light lens 236. The light lens 236 is substantially similar to the light lens 36, and facilitates the expansion of each mono-colored pulse of high intensity light into a coherent projection light along an input optical path 238.

In operation, each of the lasers 222, 226 and 230 are switched between their ON and OFF states in a sequential fashion to generate sequential mono-colored pulses of high intensity light. The mono-colored pulses of high intensity light are focused by the prism 234 and expanded by the light lens 236 to generate the coherent projection light along the input optical path 238. In this regard, the red laser 222 is switched ON and then OFF to generate a red mono-colored pulse of high intensity light, which is translated into a red pulse of coherent projection light along input optical path 238. Subsequently, the green laser 226 is switched ON and then OFF to generate a green high intensity light. This green high intensity light is then translated into a green coherent projection light along input optical path 238. Finally, the blue laser 230 is switched ON and then OFF to generate a blue high intensity light. This blue high intensity light is then translated into a blue pulse coherent projection light along the input optical path 238.

While in the preferred embodiment the lasers 222, 226 and 230 are each switched ON and OFF in the sequence, red laser 222, green laser 226 and blue laser 230, it will be understood by one skilled in the art that other combinations and sequences are also possible.

Figure 3:
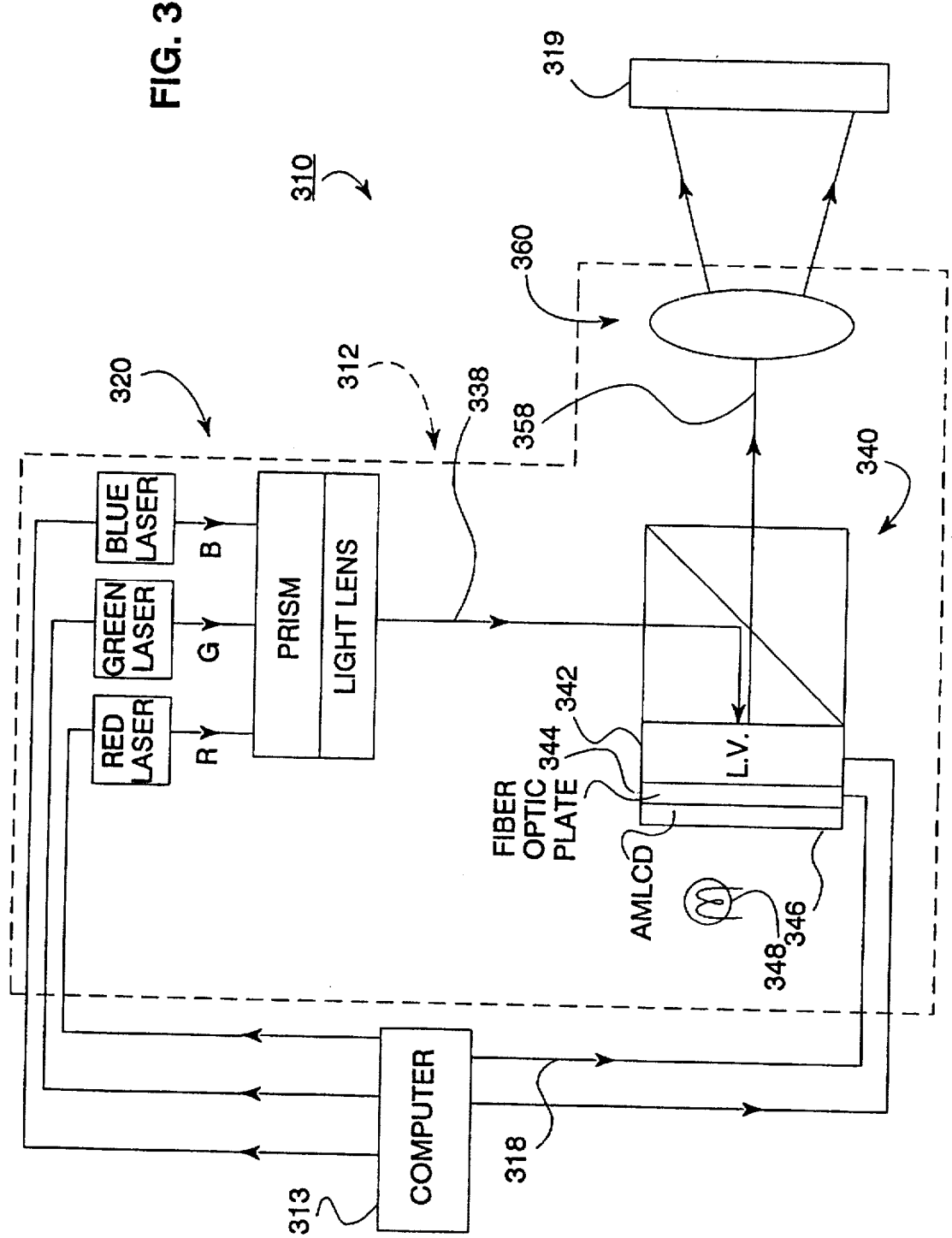
FIG. 3 is a block diagram of still another laser illuminated image projection system, which is also constructed in accordance with the present invention.

Referring now to FIG. 3, there is shown yet another image producing system 310 which is also constructed according to the present invention. The image producing system 310 is similar to the image producing system 210 and includes an image generating arrangement 312, a computer 313 to control the image generating arrangement 312, and a remote surface 319 to display the desired image.

The image generating arrangement 312 includes a light source 320 and a projection lens 360 which are substantially similar to the light source 220 and the projection lens system 260 of FIG. 2, and will not be described hereinafter in greater detail.

Considering now the spacial light modulator 340 in greater detail, the spacial light modulator 340 includes a light valve 342 for modulating a coherent projection light from the light source 320 traveling along an input optical path 348. The light valve 342 is substantially similar to the light valve 42, and will not be described hereinafter in greater detail.

To provide a writing light for generating the desired image within the light valve 342, the spacial light modulator 340 further includes an active matrix liquid crystal display or AMLCD 346 and an incandescent light source 348. The image produced by the combination of the AMLCD 346 and the incandescent light source 348 is transmitted to the light valve 342 by a FIBER OPTIC PLATE 344 to write the image onto the light valve 342. The AMLCD 346 is connected to the computer 313 by conductor 318 to vary the writing light as required.

In operation, the incandescent light source 348 produces a writing light which is modulated by the AMLCD 346. The modulated writing light is then transferred through the FIBER OPTIC PLATE 344 to impinge the writing light surface of the light valve 342. The coherent projection light strikes the reading light surface of the light valve 342 and is modulated accordingly to produce the output light along output optical path 358 to facilitate the projection of the desired image on the remote surface 219.

Figure 4:
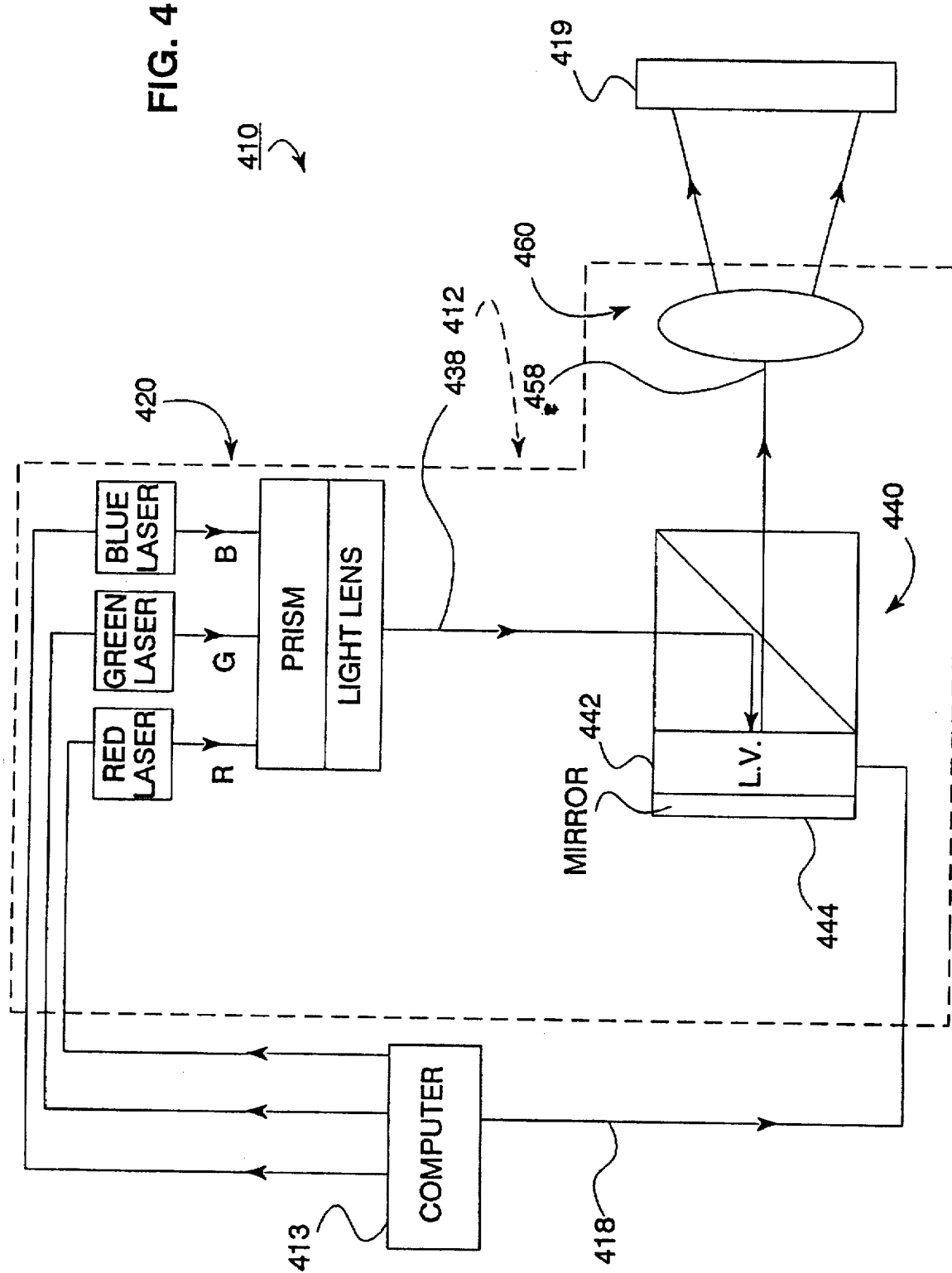
FIG. 4 is a block diagram of a further laser illuminated image projection system, which is also constructed in accordance with the present invention.

Referring now to FIG. 4, there is shown another image producing system 410 which is also constructed in accordance with the present invention. The image producing system 410 includes a light source 420 and a projection lens system 460 which are substantially similar to the light source 220 and the projection lens system 260, respectively, and will not be described hereinafter in greater detail.

Considering now the spacial light modulator 440 in greater detail, a coherent projection light emanating from the light source 420 along an input optical path 438 is directed onto a light valve 442 to modulate the coherent projection light to produce the desired projected image. The light valve 442 is connected to a computer 413 by conductor 418 to modulate the coherent projection light. The light valve 442 is preferably a thin film transistor light valve, such as a ferroelectric liquid crystal display or FLCD. Attached to the light valve 442 is a mirror 444 to reflect the modulated coherent projection light as output light along output optical path 458 to be projected onto remote surface 419.

In operation, the coherent projection light is directed onto the light valve 442. The coherent projection light is then modulated by the light valve 442 to generate the desired image. The modified coherent projection light is reflected by the mirror 444 back through the light valve 442 along the output optical path 458 as output light representative of the desired image. The output light is then projected by a projection lens system 460 onto the remote surface 419 for viewing.

Figure 5:
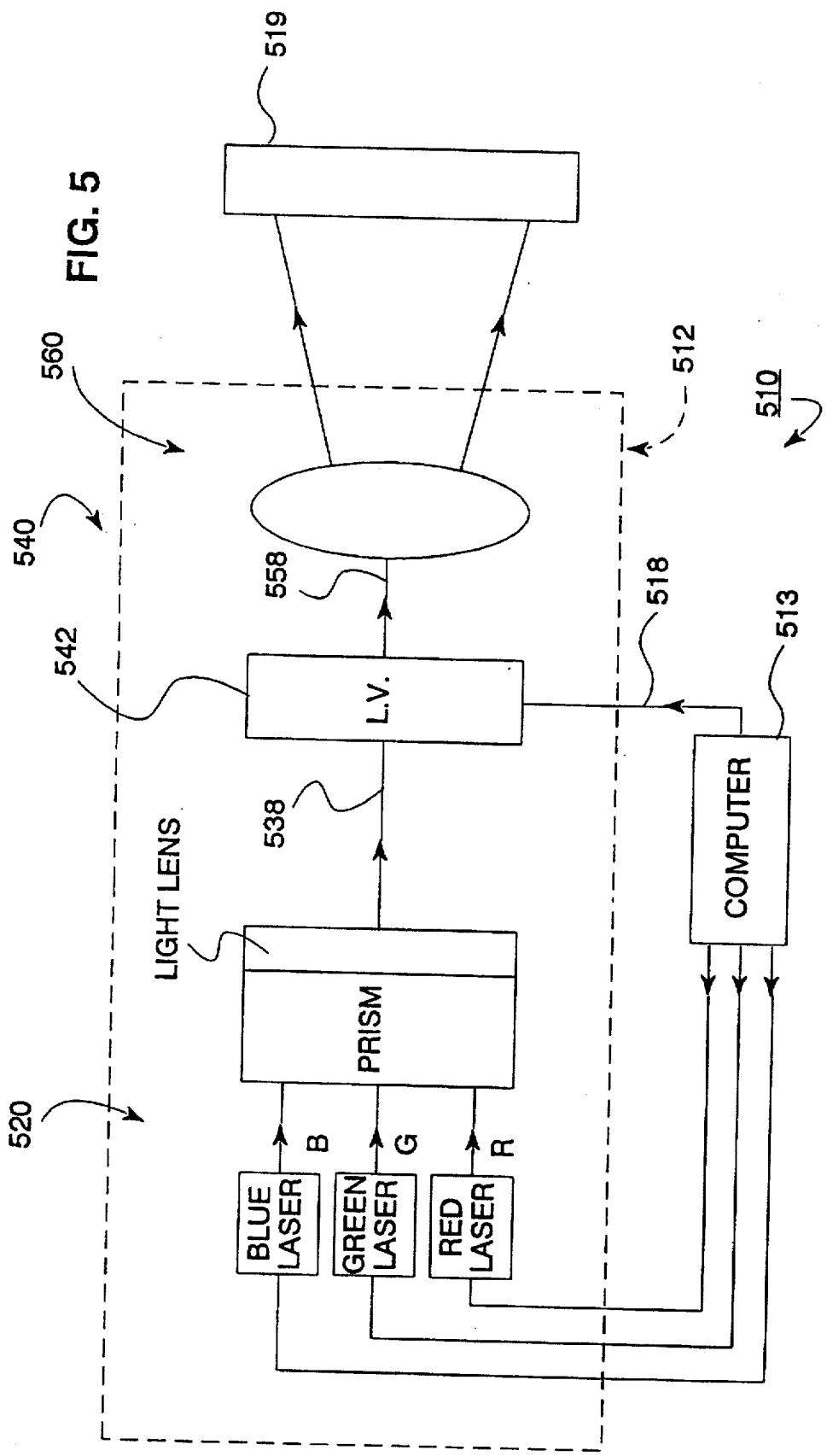
FIG. 5 is a block diagram of yet another laser illuminated image projection system, which is also constructed in accordance with the present invention.

Referring now to FIG. 5, there is shown yet another image producing device 510 which is also constructed in accordance with the present invention. The image producing system 510 includes an image generating arrangement 512 to generate the desired image, a computer 513 to control the operation of the image generating arrangement 512, and a remote surface 519 to display the desired image.

Considering now the image generating arrangement 512 in greater detail, the image generating arrangement 512 includes a light source 520 and a projection lens system 560 which are substantially similar to the light source 220 and the projection lens system 260, respectively, and will not be described hereinafter in greater detail. The image generating arrangement 512 further includes a light valve 542 to modulate coherent light generated by the light source along an input optical path 548. Light valve 542 is substantially similar to the light valve 442. However, the light valve 542 operates as a transmissive light valve instead of a reflective light valve. In this regard, the light valve 542 modulates the coherent projection light along the input optical path 538 to produce output light representative of the desired image along output optical path 558, wherein the coherent projection light passes through, or is transmitted through, the light valve 542 as the output light.

Figure 6:
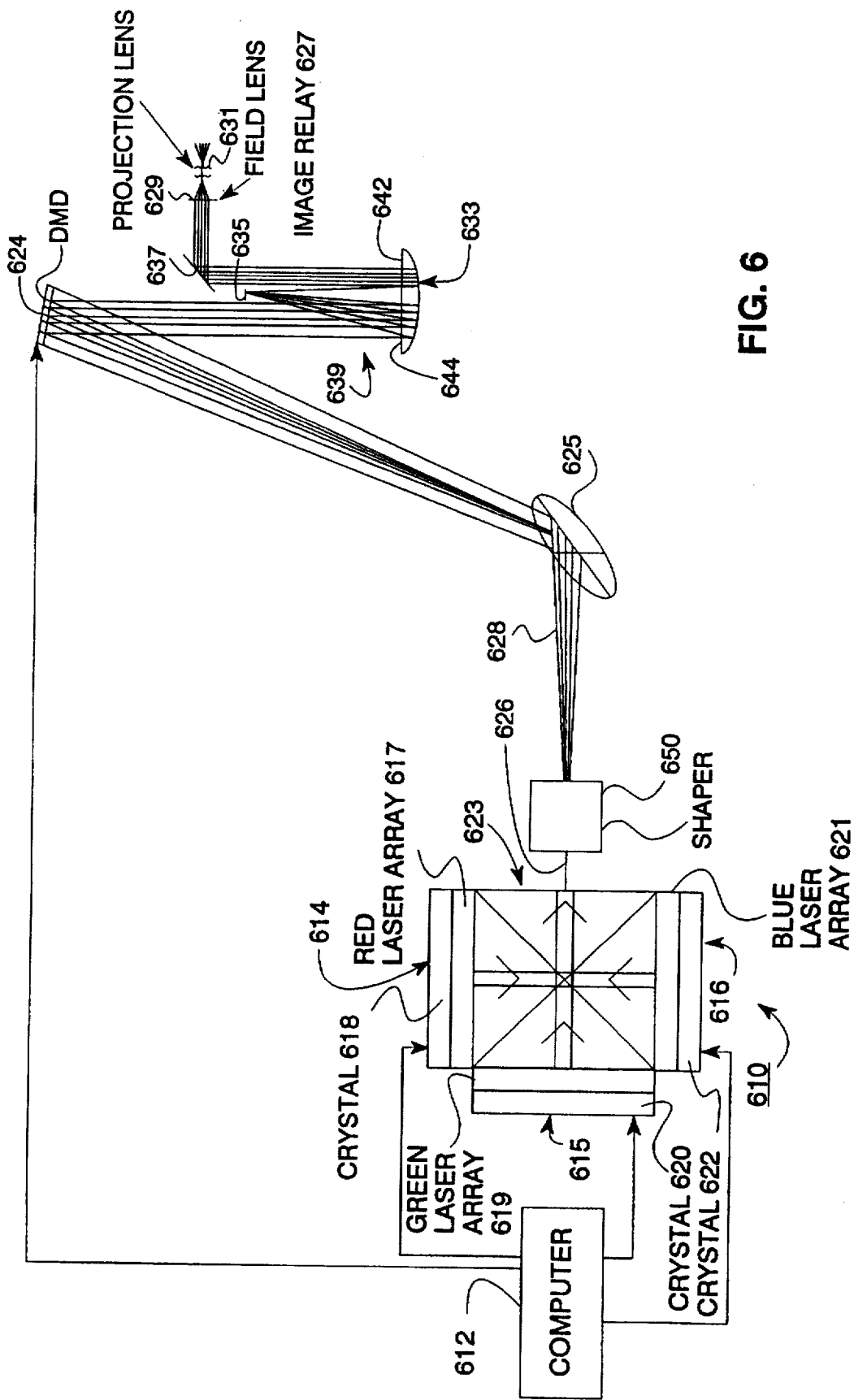
FIG. 6 is a block diagram of still another laser illuminated image projection system, which is also constructed in accordance with the present invention.

Referring now to FIG. 6, there is shown an image producing system 610, which is constructed in accordance with the present invention. The image producing system 610 is controlled by computer 612 and is able to project an image to a remote viewing surface (not shown).

The system 610 includes a red laser 614, a green laser 615, and a blue laser 616. The red laser is shown diagrammatically as having a red laser diode 617 and a red crystal 618. Similarly, the green laser 615 is represented diagrammatically as having a green laser diode 619 and a green crystal 620, and the blue laser 616 is represented diagrammatically as having a blue laser diode 621 and blue crystal 622.

An immersed egg-crate dichroic mirror assembly 623 combines the three laser lights into a single combined light beam generally indicated at 626. Examples of immersed egg-crate dichroic mirrors are described in U.S. Pat. No. 2,740,829, entitled "PROJECTION COLOR TELEVISION RECEIVER," and U.S. Pat. No. 2,945,413, entitled "OPTICAL BEAM LINKING SYSTEMS," which are incorporated by reference as if fully set forth herein.

As indicated diagrammatically in FIG. 6, the three lasers are disposed on three faces of the mirror assembly 623. The three laser diodes 617, 619, and 621 are indicated to be three individual large laser diodes. Alternatively, in place of a single laser diode, a matrix arrangement of a plurality of individual small diodes may be employed.

A deformable mirror device 624 serves as a spatial light modulator to form a bright image from the combined laser light beam 626 reflected thereto via a circular mirror 625 tilted at an oblique angle to direct the light to the deformable mirror device 624. An image relay arrangement generally indicated at 627 provides a folded light path for the ON reflected light from the deformable mirror device 624 for directing the reflected ON light to a field lens 629, which in turn conveys the light to a projection lens 631 for projecting an enlarged image onto the remote viewing surface (not shown).

An image relaying arrangement 627 employs a concave spherical mirror 633 which reflects the ON reflected light from the deformable mirror device 624 to a convex mirror 635, which in turn causes its reflected light to impinge back onto the concave spherical mirror 633. A mirror 637 reflects the light from the concave spherical mirror 633 to the field lens 629. In this manner, the image relay arrangement 627 provides a folded optical path between the deformable mirror device 624 and the field lens 629.

The deformable mirror device 624 employs a matrix of individual pixel mirrors (not shown) which are movable between a position for reflecting the ON beam toward the concave spherical mirror 633, and another position to reflect the beam away from the concave spherical mirror 633 and toward a black baffle (not shown) for absorbing the OFF reflected beam. In this manner, an image is formed from the combined laser light beam 626 for projecting it by means of the projection lens 631 via the field lens 629 and the image relay arrangement 627. The circular mirror 625 is tilted at an oblique angle to align it with the tilted pixel mirrors of the deformable mirror device 624.

It should be understood that the reflected ON light beams 639 from the deformable mirror device 624 must be of a sufficient length relative to the projection lens to provide the desired magnification of the projected image. However, in order to have an overall compact configuration for the system 610, the image relay arrangement 627 provides a folded light path to enable the projection lens 631 to be disposed in a compact manner relative to the deformable mirror device 624. Additionally, the image relay arrangement 627 also has the advantage that the overall contrast of the projected image is of a high quality, since the OFF reflected light beams (not shown) from the deformable mirror device 624 will less likely interfere with ON reflected beam from the deformable mirror device 624 entering the projection lens 631 to reduce the contrast between the ON and OFF pixels of the resulting image.

Additionally, the image relay arrangement 627 provides the advantage that a speckle remover (not shown) can be conveniently located at or near the field lens 629 and the projection lens 631 in a convenient manner within a same compact housing (not shown) for the system 610. Such a speckle remover is usually desirable when the source of illumination is by laser.

Keystone correction is accomplished by offsetting the relay lens and the projection lens 631. In this manner, the light exiting the projection lens 631 may be corrected in a convenient manner. The projection lens 631 is a four element Tessar lens configuration. It may also be a six element Orthometar design form configuration. In either form of the lens assembly, a small aperture helps provide high contrast for the resulting image.

Figure 7:
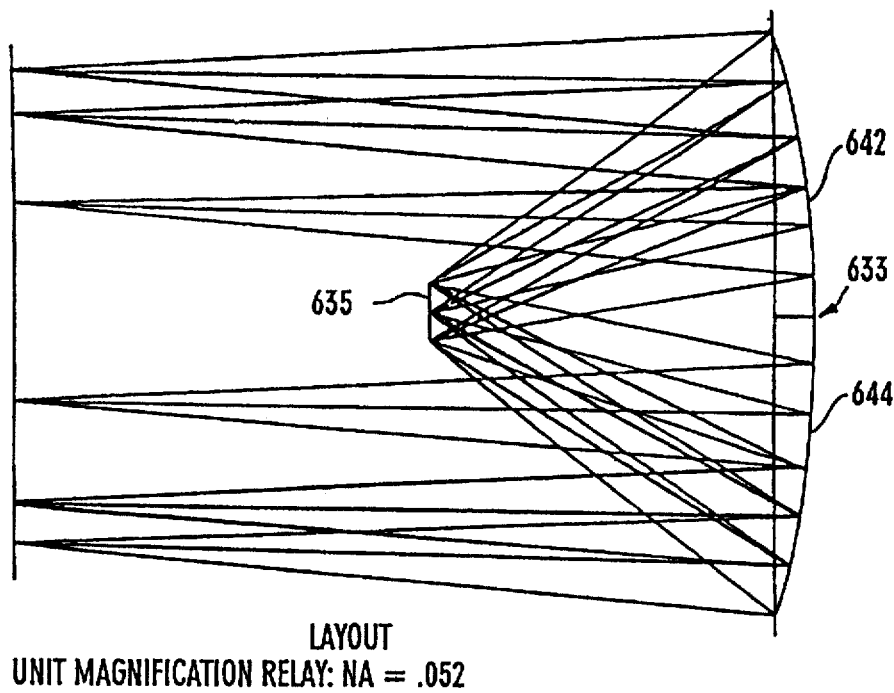
FIG. 7 is an enlarged view of an image relay of FIG. 6.

The concave spherical mirror 633 comprises a pair of concentric spherical mirrors 642 and 644 so that there are no third order aberrations. As shown in FIG. 7 in greater detail, the concave spherical mirror 633 provides a pre-lane of the image and Offner autocollimating telescope approach. Thus, in accordance with an important feature of the present invention, the image from the deformable mirror device 624 is relayed to the field lens 629 so that the projection lens 631 can be mounted in relationship to the field lens 629 in a compact overall arrangement.

Figure 8:
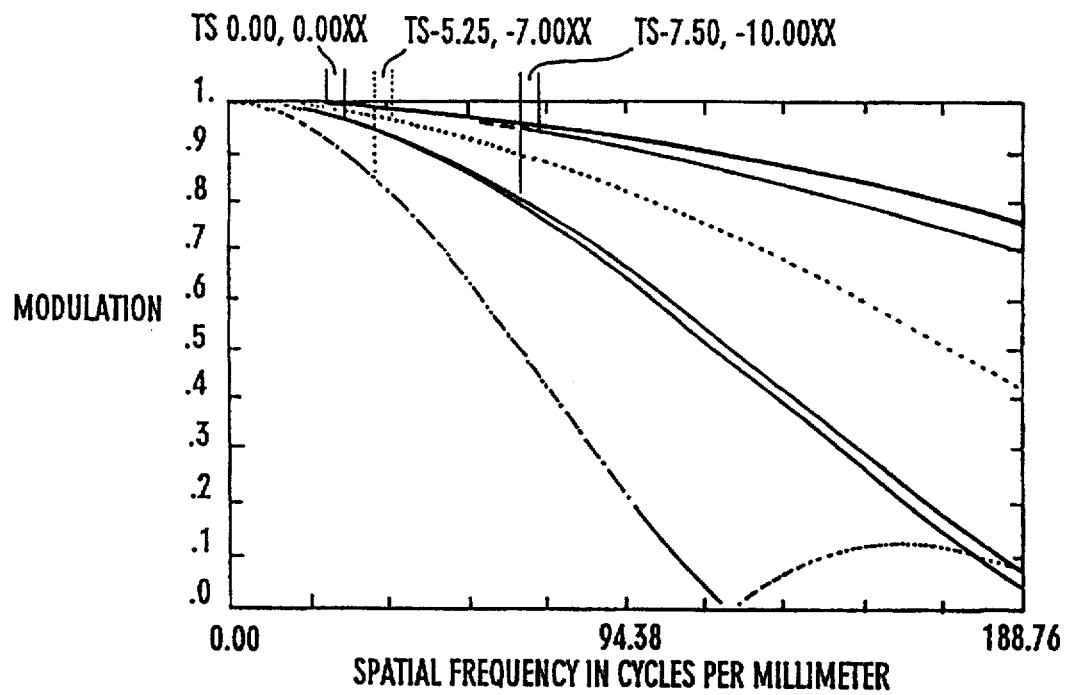
FIG. 8 is a graph representative of the polychromatic geometric modulation transfer function associated with the image relay of FIGS. 6 and 7.

Referring now to FIG. 8, there is shown the polychromatic geometric modulation transfer function relative to the spatial frequency. This illustrates the unit magnification of the UA arrangement.

LASER PULSING ARRANGEMENT

In accordance with the present invention, the lasers 614, 615 and 616 of the system 610 are sequentially pulsed in accordance with the present invention to achieve a bright projected image at a favorable of cost of energizing the lasers in a highly efficient manner. In this regard, each one of the image producing systems of FIGS. 2–5, are also pulsed in the same inventive manner as the lasers 614, 615 and 616 of the system 610 as hereinafter described in greater detail.

Under computer control, the lasers generate a plurality of different color laser lights. Under computer control, the lasers cause the laser lights produced thereby to be individually and sequentially pulsed to cause them to be energized at a substantially peak ON output luminosity for a short ON period of time, thereby providing a high average output luminosity at a low average energy cost.

Each one of the lasers is controlled by the computer individually and sequentially to cause them to be deactivated at a near ON output luminosity for a short OFF period of time to enable the laser lights to switch between OFF and ON in an efficient manner. As a result, a bright image is formed from the combined laser lights.

By operating the diodes in a pulsed manner substantially at their peak outputs, the resulting projected image is very bright. If the lasers are continuously operated at their peak output, the useful life of the lasers 614, 615 and 616 is drastically reduced. Therefore, the lasers are pulsed ON and OFF during the same frame time of the projection system. In this regard, the lasers are operated sequentially during the same frame time and preferably, each one is ON for one-third of a frame interval. Thus, for example, the average power consumed by the lasers is only approximately one-third of the peak power. Additionally, in accordance with the present invention, the lasers are biased nearly ON during their OFF period of time so that the crystals of each laser are operating at or near a preferred condition. In this regard, when the laser is OFF, it is prepared to go back ON in a most efficient and effective manner. Thus, the luminosity output of the lasers is even greater due to the higher efficiency operation of the lasers so that the input energy to the lasers is proportionally decreased as a result. In short, the laser arrangement is pulsed according to the invention to provide an extremely hot bright output light at a low input energy level in a highly efficient manner, so that the resulting output luminosity is at or near its maximum at a relatively low cost of operation due to the high efficiency.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An image producing system, comprising:

light source means including at least one laser device switchable between an on state and an off state for generating pulses of coherent projection light along an input optical path, wherein said coherent projection light is generated at a maximum luminosity level when said laser device is switched to said on state;

spatial light modulator means disposed in said input optical path for modulating said coherent projection light to produce output light representative of the image along an output optical path for facilitating the projection of the image onto a remote surface, wherein substantially all of said output light produced by said spatial light modulator means is projected onto said remote surface;

said spatial light modulator means includes a light valve for controlling the luminosity of said output light produced by said spatial light modulator means to facilitate reproducing the image with varying shades on said remote surface; and wherein said light source means includes at least three laser devices, said laser devices including a red laser device, a green laser device, and a blue laser device which are each switched between their on and off states to generate sequential mono-colored pulses of coherent projection light for facilitating the reproduction of the image in full color.

2. An image producing system according to claim 1, wherein said light valve is reflective.

3. An image producing system according to claim 2, wherein said light valve is beam addressed.

4. An image producing system according to claim 3, wherein said light valve is a photoelectric liquid crystal device.

5. An image producing system according to claim 4, wherein said spatial light modulator means further includes a writing means to generate the image to be projected and a fiber optic plate disposed between said photoelectric liquid crystal device and said writing means to optically transfer the image from said writing means to said photoelectric liquid crystal device.

6. An image producing system according to claim 5, wherein said writing means includes a cathode ray tube device.

7. An image producing system according to claim 5, wherein said writing means includes a writing light source, and an active matrix liquid crystal device disposed between said writing light source and said fiber optic plate.

8. An image producing system according to claim 2, wherein said spatial light modulator means further includes a mirror device for reflecting modulated coherent projection light to direct it onto said output optical path as said output light.

9. An image producing system according to claim 8, wherein said light valve is a ferroelectric liquid crystal display device.

10. An image producing system according to claim 1, wherein said light valve is transmissive.

11. An image producing system according to claim 10, wherein said light valve is a ferroelectric liquid crystal display device.

12. An image producing system according to claim 1, further including an optical lens for facilitating the coordination of a cross-sectional area of said coherent projection light with a frontal surface area of said light valve to enable substantially all of said coherent projection light to impinge said frontal surface area.

13. An image producing system according to claim 12, wherein said spatial light modulator means further includes means for redirecting said coherent projection light toward said light valve to permit said coherent projection light to impinge said light valve at about a right angle.

14. An image producing system according to claim 13, wherein said redirecting means includes a polarizing beam splitter.

15. A method according to claim 14, further including using a spherical mirror for image relaying.

16. A method according to claim 14, further including using an emersed eggcrate dichroic mirror assembly to combine the laser lights.

17. A method of projecting an image, comprising:

generating pulses of coherent projection light along an input optical path with a light source means including at least one laser device selectively switchable between an on state and an off state, wherein said coherent projection light is generated at a maximum luminosity level when said laser device is switched to said on state;

modulating said coherent projection light with a spatial light modulator means disposed in said input optical path to produce output light representative of the image along an output optical path for facilitating the projection of the image onto a remote surface, wherein substantially all of said output light produced by said spatial light modulator means is projected onto said remote surface;

controlling the luminosity of said output light produced by said spatial light modulator means with a light valve to facilitate reproducing the image with varying shades on said remote surface; and using a light source including at least three laser devices, said laser devices including a red laser device, a green laser device, and a blue laser device, and switching each of said laser devices between their on and off states to generate sequential mono-colored pulses of coherent projection light for facilitating the reproduction of the image in full color.

18. A system for producing a bright image comprising:

a plurality of lasers for generating a plurality of different colored laser lights;

means for controlling each one of the lasers individually and sequentially to cause them to be energized at a substantially peak ON output luminosity for a short ON period of time, thereby providing a high average output luminosity at a low average energy cost;

means for controlling each one of the lasers individually and sequentially to cause them to be activated and deactivated selectively during a portion only of a frame time interval between a near ON output luminosity for a long OFF period of time and said substantially peak ON output luminosity for said short ON period of time to enable the lasers to switch between OFF and ON in an efficient manner;

means for forming a bright image from the laser lights;

wherein said means for forming includes a deformable mirror device; and an image relaying arrangement for the deformable mirror device to shorten effectively the optical path of the ON light reflected from the deformable mirror device.

19. A system according to claim 18, wherein said arrangement includes a spherical mirror for image relaying purposes.

20. A system according to claim 18, further including an emersed eggcrate dichroic mirror assembly to combine the laser lights.

21. A method of producing a bright image utilizing a plurality of different colored lasers, comprising:

generating a plurality of different colored laser lights;

controlling each one of the laser lights individually and sequentially to cause them to be energized at a substantially peak ON output luminosity for a short ON period of time, thereby providing a high average output luminosity at a low average energy cost;

controlling each one of the laser lights individually and sequentially to cause them to be activated and deactivated selectively during a portion only of a frame time interval between a near ON output luminosity for a long OFF period of time and said substantially peak ON output luminosity for said short ON period of time to enable the laser lights to switch between OFF and ON in an efficient manner;

forming a bright image from the laser lights;

wherein the image is formed by using a deformable mirror device; and image relaying from the deformable mirror device to shorten effectively the optical path of the ON light reflected from the deformable mirror device.

* * * * *